(12) United States Patent
Phillips et al.

(10) Patent No.: US 12,163,612 B2
(45) Date of Patent: Dec. 10, 2024

(54) PIPE JOINT

(71) Applicant: AIRBUS OPERATIONS LIMITED, Bristol (GB)

(72) Inventors: Samuel Phillips, Bristol (GB); Anthony Bryant, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 225 days.

(21) Appl. No.: 17/843,257

(22) Filed: Jun. 17, 2022

(65) Prior Publication Data
US 2022/0403968 A1    Dec. 22, 2022

(30) Foreign Application Priority Data

Jun. 18, 2021 (GB) .................... 2108775.4

(51) Int. Cl.
*F16L 39/00* (2006.01)
(52) U.S. Cl.
CPC .................. *F16L 39/005* (2013.01)
(58) Field of Classification Search
CPC ................ F16L 39/005; F16L 2201/30
See application file for complete search history.

(56) References Cited

U.S. PATENT DOCUMENTS

| | | | |
|---|---|---|---|
| 5,433,484 A * | 7/1995 | Ewen | F16L 39/005 |
| 5,681,063 A | 10/1997 | Bressner | |
| 6,682,102 B1 | 1/2004 | Betz | |
| 6,848,720 B2 | 2/2005 | Carns et al. | |
| 7,427,084 B1 | 9/2008 | Betz | |
| 2004/0026922 A1 * | 2/2004 | Carns | F16L 39/005 |
| 2015/0130183 A1 * | 5/2015 | Statler, III | F16L 39/005 |
| 2015/0316186 A1 | 11/2015 | Norris | |

FOREIGN PATENT DOCUMENTS

| | | | | |
|---|---|---|---|---|
| EP | 2045503 A2 * | 4/2009 | | F16L 39/005 |
| EP | 2 388 503 | 11/2011 | | |
| EP | 3862611 A1 * | 8/2021 | | |
| FR | 527140 | 10/1921 | | |

OTHER PUBLICATIONS

Combined Search and Examination Report for GB2108775.4, dated Mar. 14, 2022, 14 pages.

* cited by examiner

*Primary Examiner* — Zachary T Dragicevich
(74) *Attorney, Agent, or Firm* — Nixon & Vanderhye P.C.

(57) ABSTRACT

A pipe joint including an outer pipe assembly having a first outer pipe portion, a second outer pipe portion, and a shroud coupling the first and second outer pipe portions. The outer pipe joint includes an outer securing mechanism securing the shroud to the second outer pipe portion. The inner pipe assembly, within the outer pipe assembly, includes a first inner pipe portion coupled to a second inner pipe portion via an inner pipe joint. The inner pipe assembly provides an inner fluid flow path extending axially and across the inner pipe joint. The shroud is movably mounted to the first outer pipe portion, and the outer securing mechanism is releasable so the shroud can move along the first outer pipe portion and withdrawn from the second outer pipe portion to open a gap between the shroud and the second outer pipe portion for the inner pipe joint.

20 Claims, 6 Drawing Sheets

PIPE JOINT

RELATED APPLICATION

The application incorporates by reference and claims priority to United Kingdom patent application GB 2108775.4, filed Jun. 18, 2021.

FIELD

The present invention relates to a pipe joint and a method of assembling and disassembling such a pipe joint.

BACKGROUND

Double containment pipes use a primary inner pipe inside a secondary outer pipe. This creates a fail-safe system that contains any leaked fluid if a failure occurs in the primary pipe, as disclosed in U.S. Pat. No. 6,848,720. When double containment pipes are used for long pipe systems, installation, access and repair of the inner pipe joints are difficult.

SUMMARY

A first aspect of the invention provides a pipe joint comprising: an outer pipe assembly comprising a first outer pipe portion, a second outer pipe portion, and a shroud which couples the first outer pipe portion to the second outer pipe portion via an outer pipe joint, wherein the outer pipe joint comprises an outer securing mechanism which secures the shroud to the second outer pipe portion; and an inner pipe assembly within the outer pipe assembly, the inner pipe assembly comprising a first inner pipe portion coupled to a second inner pipe portion via an inner pipe joint, wherein the inner pipe assembly is configured to provide an inner fluid flow path which extends in an axial direction and across the inner pipe joint, wherein the shroud is movably mounted to the first outer pipe portion, and the outer securing mechanism is configured to be releasable to enable the shroud to be moved along the first outer pipe portion in the axial direction and withdrawn away from the second outer pipe portion, thereby opening a gap between the shroud and the second outer pipe portion which provides access to the inner pipe joint.

A further aspect of the invention provides a method of disassembling a pipe joint according to the first aspect, the method comprising: releasing the outer securing mechanism; then moving the shroud along the first outer pipe portion in the axial direction to withdraw the shroud away from the second outer pipe portion, thereby opening up a gap between the shroud and the second outer pipe portion; and then accessing the inner pipe joint via the gap to disassemble the inner pipe joint, thereby decoupling the first inner pipe portion from the second inner pipe portion.

A further aspect of the invention provides a method of assembling a pipe joint according to the first aspect, the method comprising: coupling the first inner pipe portion to the second inner pipe portion; then closing a gap between the shroud and the second outer pipe portion by moving the shroud along the first outer pipe portion in the axial direction towards the second outer pipe portion; and then coupling the first outer pipe portion to the second outer pipe portion by securing the shroud to the second outer pipe portion with the outer securing mechanism.

Optionally, the pipe joint further comprises an interspace between the inner pipe assembly and the outer pipe assembly, and the interspace is configured to provide an outer fluid flow path which extends in the axial direction and across the outer pipe joint.

Optionally the interspace contains a vacuum, and/or insulation material. Optionally the interspace is configured to contain a vacuum.

Optionally the outer pipe joint comprises an outer seal member between the shroud and the second outer pipe portion, wherein the outer seal member is in a state of compression in the axial direction.

Optionally the outer seal member is configured such that releasing the outer securing mechanism and/or withdrawing the shroud away from the second outer pipe portion causes the outer seal member to decompress in the axial direction.

Optionally the first outer pipe portion comprises a shroud stop which is configured to limit a range of the movement of the shroud in the axial direction away from the second outer pipe portion.

Optionally the first outer pipe portion comprises a pipe stop which engages the shroud and is configured to inhibit movement of the first outer pipe portion in the axial direction away from the second outer pipe portion, wherein the shroud is configured to disengage from the pipe stop as it withdraws away from the second outer pipe portion.

Optionally the first outer pipe portion has an external thread, and the outer pipe assembly further comprises an internally threaded nut which is carried on the external thread of the first outer pipe portion and abuts the shroud, wherein the shroud is positioned between the outer pipe joint and the internally threaded nut.

Optionally the pipe joint further comprises a shroud seal member between the shroud and the first outer pipe portion.

Optionally the shroud seal member is between the shroud and the pipe stop, and the shroud seal member is in a state of compression in the axial direction. Alternatively the shroud seal member may be in a state of compression in a radial direction.

Optionally the shroud seal member is configured such that releasing the outer securing mechanism and/or withdrawing the shroud away from the second outer pipe portion causes the shroud seal member to decompress in the axial direction.

Optionally the outer securing mechanism comprises a clamp or fastener.

Optionally the outer securing mechanism comprises a V-clamp which is configured to apply a clamping force between the shroud and the second outer pipe portion in the axial direction.

Optionally the inner pipe joint comprises an inner securing mechanism which secures the first inner pipe portion to the second outer pipe portion, the inner securing mechanism is configured to be releasable to enable the first inner pipe portion and the second inner pipe portion to be separated from each other, and the shroud is configured to enable the gap to provide access to the inner securing mechanism such that the inner securing mechanism can be released via the gap.

Optionally the shroud comprises a first sleeve which engages the first outer pipe portion; a second sleeve with a larger inner diameter than the first sleeve; and a shoulder which connects the first sleeve to the second sleeve. The larger inner diameter of the second sleeve may prevent it from clashing with the inner pipe joint.

Optionally the inner fluid flow path contains fluid (liquid or gaseous) at a temperature below −150° C., or is configured to contain fluid at a temperature below −150° C.

Optionally the inner fluid flow path contains liquid hydrogen or gaseous hydrogen, or the inner fluid flow path is configured to contain liquid hydrogen or gaseous hydrogen.

Optionally the pipe joint is characterised by an absence of mechanical connection between the inner pipe assembly and the outer pipe assembly at the pipe joint.

Optionally pipe apparatus is provided comprising the pipe joint of the first aspect, and at least one spacer fitted between the inner pipe assembly and the outer pipe assembly, wherein the spacer is configured to maintain a co-axial relationship between the inner pipe assembly and the outer pipe assembly.

Optionally there are at least three separate points of contact between the spacer and the outer pipe assembly.

Optionally the spacer is polygonal.

Optionally, the spacer is non-metallic.

Optionally, the spacer enables fluid to flow across the spacer.

Optionally the first inner pipe portion comprises a first annular flange, the second inner pipe portion comprises a second annular flange, and the first and second annular flanges contact each other at the inner pipe joint. The first and second annular flanges may be secured with each other by fasteners, by a V-clamp, or in any other way.

Optionally the pipe joint or the pipe apparatus is provided in an aircraft.

BRIEF DESCRIPTION OF THE DRAWINGS

Embodiments of the invention will now be described with reference to the accompanying drawings, in which.

DETAILED DESCRIPTION OF EMBODIMENT(S)

Figure 1A:
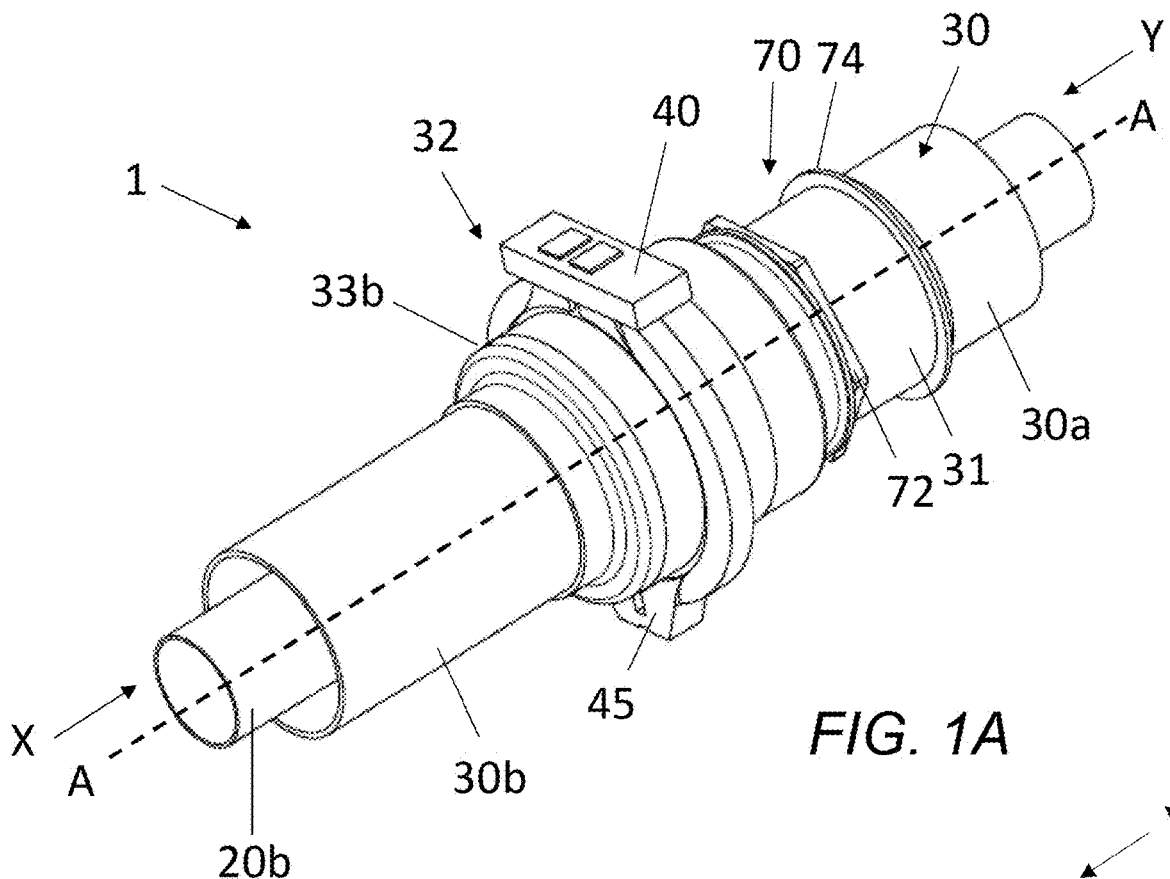
FIG. 1A shows an assembled pipe joint in a closed configuration.
Figure 1B:
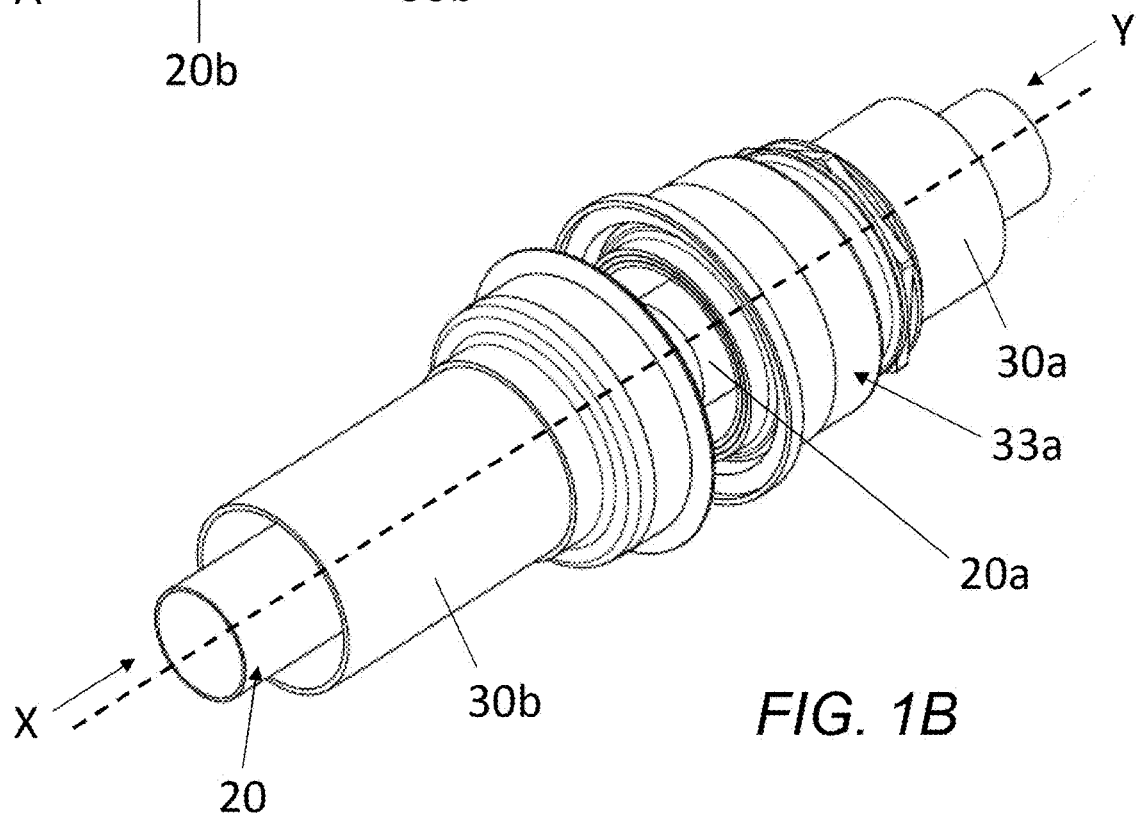
FIG. 1B shows the pipe joint of FIG. 1 in an open configuration.
Figure 2A:
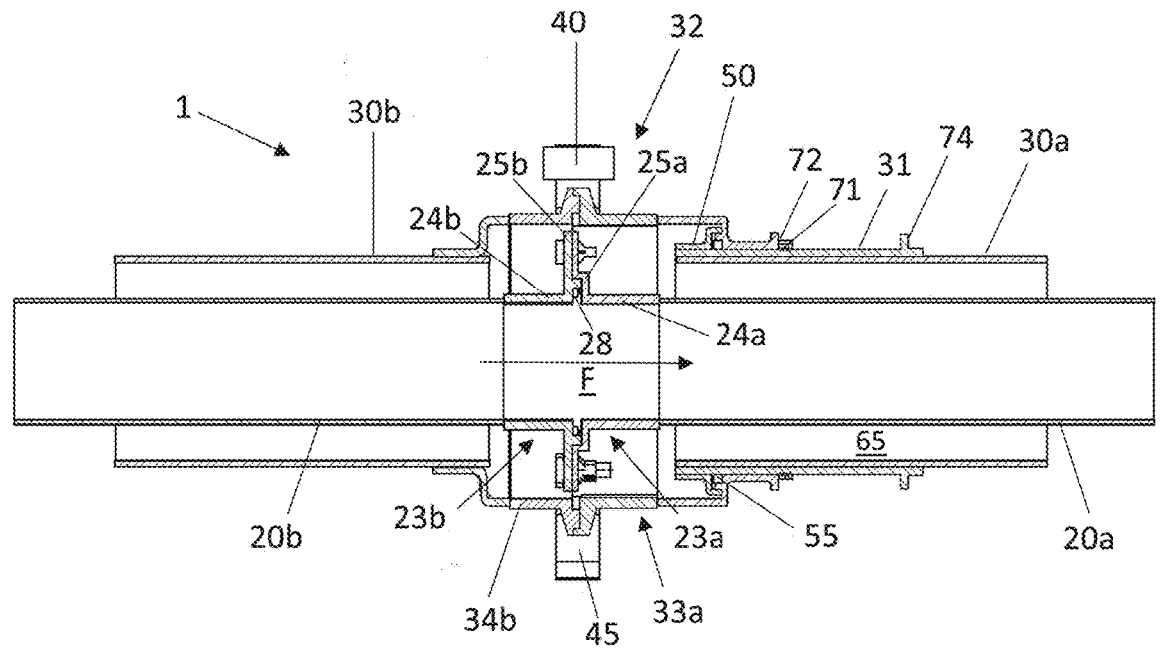
FIG. 2A shows a cross-section of the pipe joint of FIG. 1.
Figure 2B:
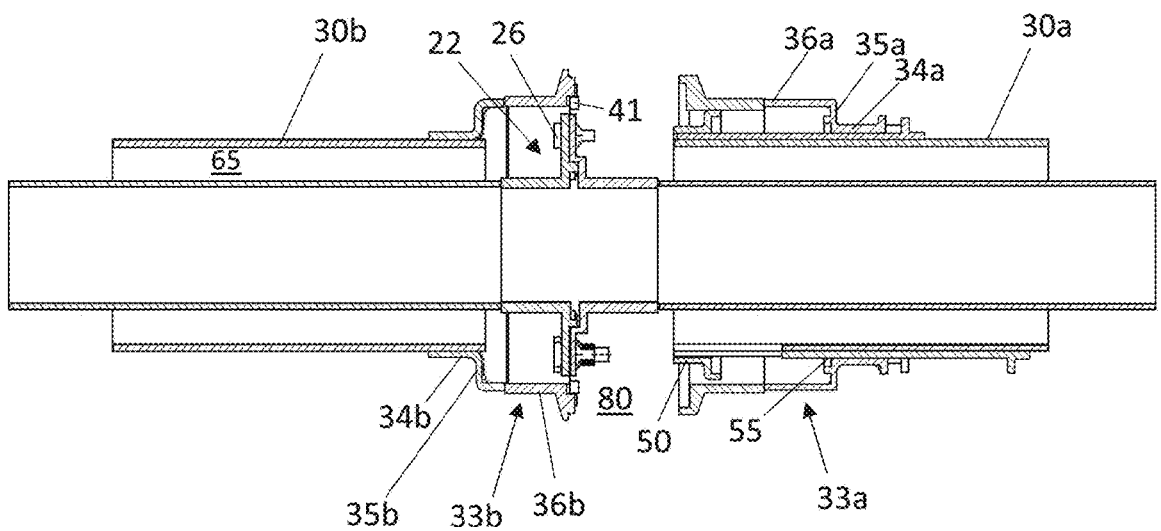
FIG. 2B shows a cross-section of the pipe joint in the open configuration of FIG. 1B.
Figure 3A:
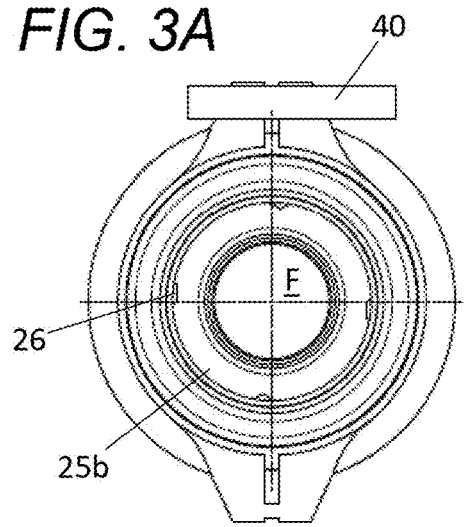
FIG. 3A shows the pipe joint 1 of FIG. 1A viewed in direction X.
Figure 4A:
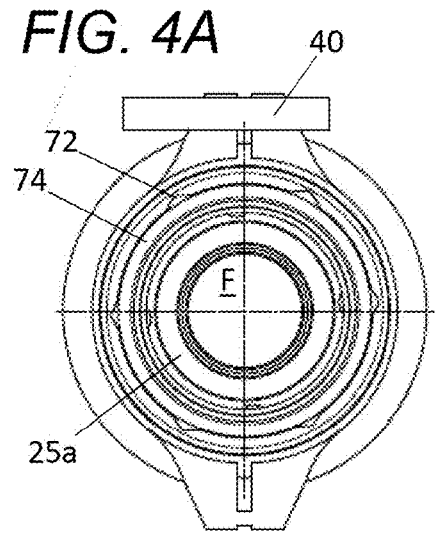
FIG. 4A shows the pipe joint 1 of FIG. 1A viewed in the opposite direction Y.
Figure 3B:
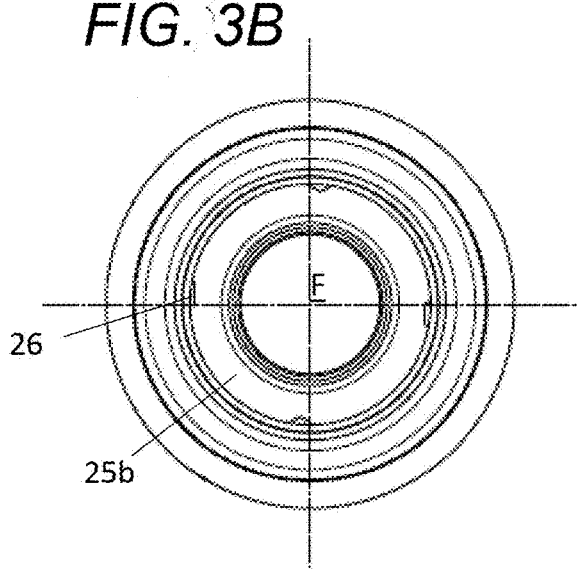
FIG. 3B shows the parts of FIG. 1B viewed in direction X.
Figure 4B:
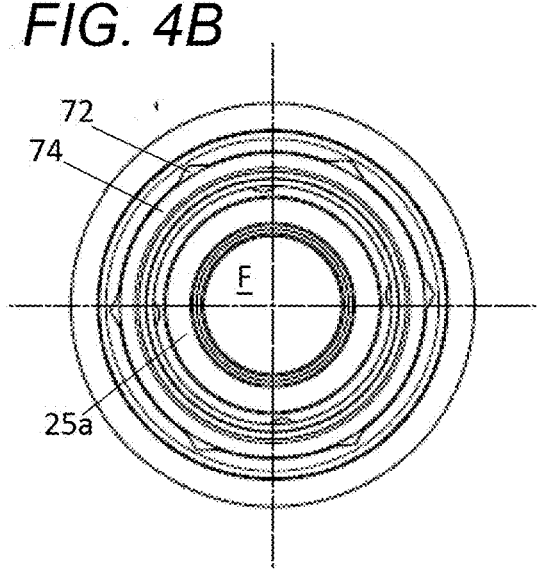
FIG. 4B shows the parts of FIG. 1B viewed in the direction Y.
Figure 7:
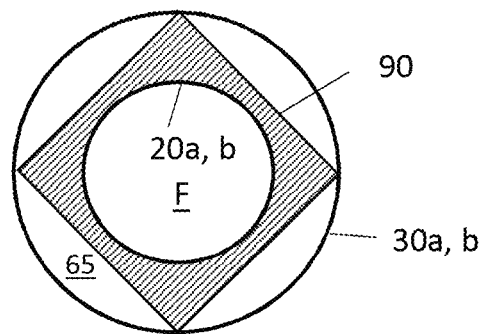
FIG. 7 shows a spacer.
Figure 8:
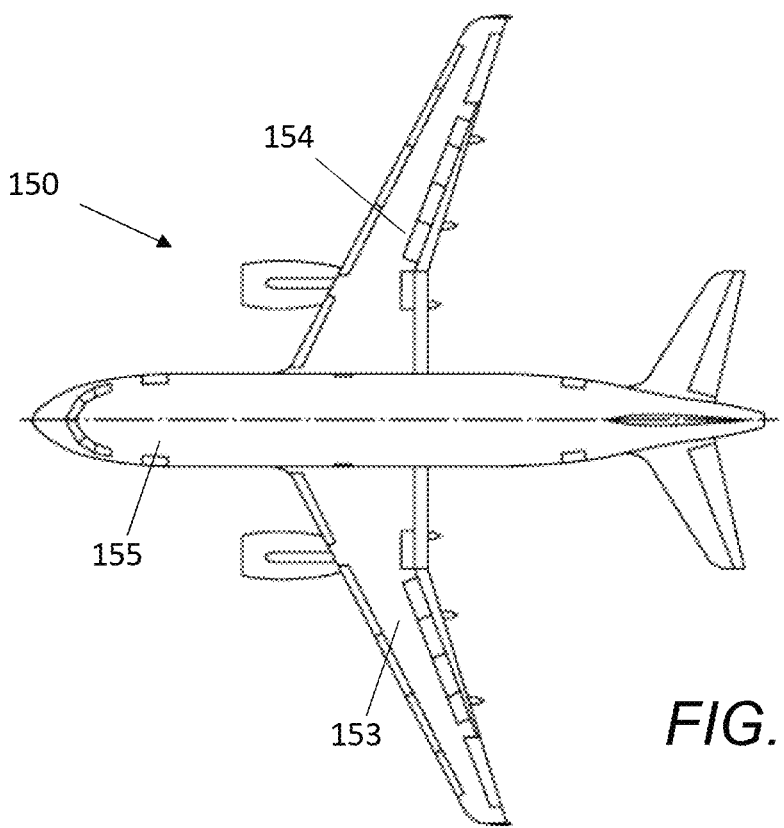
FIG. 8 is a plan view of an aircraft.

A pipe joint 1 is shown in a closed configuration in FIGS. 1A and 2A, and in an open configuration in FIGS. 1B and 2B. The pipe joint 1 comprises an inner pipe assembly within an outer pipe assembly. The pipe joint 1 is part of a pipe apparatus which may also include spacers remote from the pipe joint 1, as shown in FIG. 7.

The outer pipe assembly comprises a first outer pipe portion 30a, 31, 50 on the right-hand side of FIG. 2A; and a second outer pipe portion 30b, 33b on the left-hand side of FIG. 2A. A shroud 33a couples the first outer pipe portion to the second outer pipe portion via an outer pipe joint 32.

The first outer pipe portion comprises an assembly of parts 30a, 31, 50 including a first outer pipe 30a, a sleeve 31 welded to the first outer pipe 30a, and a pipe stop in the form of a collar 50 welded to the sleeve 31. The sleeve 31 has a shroud stop 74 in the form of an annular flange.

The second outer pipe portion comprises an assembly of parts 30b, 33b including a second outer pipe 30b, and an end fitting 33b welded to the second outer pipe 30b. As shown in FIG. 2B, the end fitting 33b has a first sleeve 34b welded to the second outer pipe 30b; a second sleeve 36b with a larger inner diameter than the first sleeve 34b, and a shoulder 35b which connects the first sleeve 34b to the second sleeve 36b. An outer seal member 41 is mounted to the end fitting 33b.

The outer pipe joint 32 comprises an outer securing mechanism, which in this case is a V-clamp 40 with a hinge 45. The V-clamp 40 secures the shroud 33a to the end fitting 33b of the second outer pipe portion.

While only one pipe joint 1 is shown and described herein, it will be understood that the pipe joint may be part of a larger pipe system, comprising multiple similar pipe joints.

The inner pipe assembly comprises a first inner pipe portion coupled to a second inner pipe portion via an inner pipe joint 22.

The first inner pipe portion comprises an assembly of parts including a first inner pipe 20a and a first end fitting 23a.

The second inner pipe portion comprises an assembly of parts including a second inner pipe 20b and a second end fitting 23b.

The inner pipe assembly is arranged to carry fluid, and provide an inner fluid flow path F that permits the fluid to flow across the inner pipe joint 22. The fluid may be a liquid (such as kerosene or liquid hydrogen) or a gas. Optionally the inner fluid flow path contains a liquid at a temperature below −150° C. Optionally the inner fluid flow path contains liquid hydrogen at a temperature below −250° C.

The first end fitting 23a has a cylindrical body 24a welded to the end of the first inner pipe 20a, and a first annular flange 25a that extends from the body 24a. Similarly, the second end fitting 23b has a cylindrical body 24b welded to the end of the second inner pipe 20b and a second annular flange 25b that extends from the body 24b.

The first and second annular flanges 25a, 25b have faces which contact each other at the inner pipe joint 22.

The second sleeve 36b has a large inner diameter to prevent it from clashing with the annular flanges 25a, 25b of the inner pipe joint 22.

An inner seal member 28 between the flanges 25a, 25b creates a fluid tight arrangement preventing leaks through the inner pipe joint 22 from the inner fluid flow path F.

The pipe joint 1 is assembled by first assembling the inner pipe joint 23b with the shroud 33a in its withdrawn position as shown in FIGS. 1B and 2B, then assembling the outer pipe joint 32 as shown in FIGS. 1A and 2A.

To assemble the inner pipe joint 22, the faces of the two flanges 25a and 25b are brought together and secured using a plurality of fasteners 26 (such as bolts), in this case four fasteners 26. FIGS. 2A and 2B show only two of the fasteners 26 in the plane of the cross-section, but all four fasteners 26 are shown in the end views of FIGS. 3A-4B. A gap 80 provides access to the two flanges 25a and 25b so that the fasteners 26 can be installed through the gap 80 and/or tightened by a tool extending through the gap 80.

The arrangement of the inner seal member 28 and the fasteners 26 enables axial compression of the inner seal member 28 to provide a fluid tight arrangement in the inner pipe joint 22.

The shroud 33a is movably mounted to the first outer pipe portion 30a, 31, 50. The shroud comprises a first sleeve 34a which engages the first outer pipe portion; a second sleeve 36a with a larger inner diameter than the first sleeve 34a; and a shoulder 35a which connects the first sleeve 34a to the second sleeve 36a. The second sleeve 36a of the shroud 33a has a large inner diameter to allow the shroud 33a to axially displace without clashing with the collar 50 or the annular flanges 25a, 25b. The shroud 33a carries a shroud seal member 55.

To assemble the outer pipe joint 32 as shown in FIG. 2A, the gap 80 between the shroud 33a and the second outer pipe portion is closed by sliding the shroud 33a along the first outer pipe portion in the axial direction towards the second outer pipe portion until it comes into contact with the end fitting 33b of the second outer pipe portion. The outer pipe joint 32 is then secured using the V-clamp 40.

When the V-clamp 40 is closed and tightened to secure the shroud 33a to the end fitting 33b, its angled faces apply an axial force which urges the two halves of the joint together, and places the outer seal member 41 in a state of compression in the axial direction.

As the shroud 33a is slid along the first outer pipe portion, it also comes into contact with the collar 50. When the V-clamp 40 is closed and tightened, the resultant axial force places the shroud seal member 55 in a state of compression in the axial direction.

In this example the outer securing mechanism is a V-clamp 40, but other types of outer securing mechanism may be used to secure the outer pipe joint 32, such as fasteners similar to the fasteners 26.

By engaging the shroud 33a, the collar 50 is configured to inhibit movement of the first outer pipe portion 30a, 31, 50 in the axial direction away from the second outer pipe portion 30b, 33b (i.e. to the right in the viewing direction of FIG. 2A). The collar 50 also prevents the shroud 33a from being removed from the first outer pipe portion 30a, 31, 50 before the two halves of the pipe joint 1 have been brought together. The shroud 33a is configured to disengage from the collar 50 as it withdraws away from the second outer pipe portion.

The sleeve 31 has a shroud stop 74 in the form of an annular flange, and an external thread 71. An internally threaded nut 72 engages with the external thread of the sleeve 31. The inner diameter of the first sleeve 34a of the shroud 33a is greater than the outer diameter of the external thread, so the shroud 33a can be slid along the sleeve 31 without clashing with the external thread. When the shroud 33a has been slid into its closed position, and the V-clamp 40 has been tightened, the nut 72 is rotated on the thread until it abuts the shroud 33a as shown in FIG. 2A. In the assembled joint 1 of FIG. 2A, the shroud 33a is positioned between the outer pipe joint 32 and the nut 72. The nut 72 provides a locking function, preventing the shroud 33a from rotating.

The V-clamp 40 can be released and opened to enable the shroud 33a to be moved along the first outer pipe portion 30a, 31, 50 in the axial direction and withdrawn away from the second outer pipe portion 30b, 33b. This opens up the gap 80, which provides access to the inner pipe joint 22 as shown in FIG. 2B.

Thus a method of disassembling the pipe joint 1 essentially reverses the assembly method described above. The disassembly method comprises: releasing the V-clamp 40; then moving the shroud 33a along the first outer pipe portion in the axial direction to withdraw the shroud 33a away from the second outer pipe portion, thereby opening up the gap 80 between the shroud 33a and the second outer pipe portion; and then accessing the inner pipe joint 22 via the gap 80 to disassemble the inner pipe joint 22, thereby decoupling the first inner pipe portion from the second inner pipe portion.

When the V-clamp 40 is released and the nut 72 is rotated out of engagement with the shroud 33a, the outer seal member 41 and the shroud seal member 55 both decompress in the axial direction. The decompression force pushes the shroud 33a away from the second outer pipe portion 30b, 33b. The shroud 33a can then be slid back further to the withdrawn position of FIG. 2B to fully open up the gap 80.

The fasteners 26 that secure the inner pipe joint 22 can then be removed via the gap 80, to enable the first and second inner pipe portions to be separated. The gap 80 also facilitates easy access to the inner pipe joint 22 for repair purposes. Once the necessary repair has been completed, the outer pipe joint 32 can then be re-assembled.

Figure 5A:
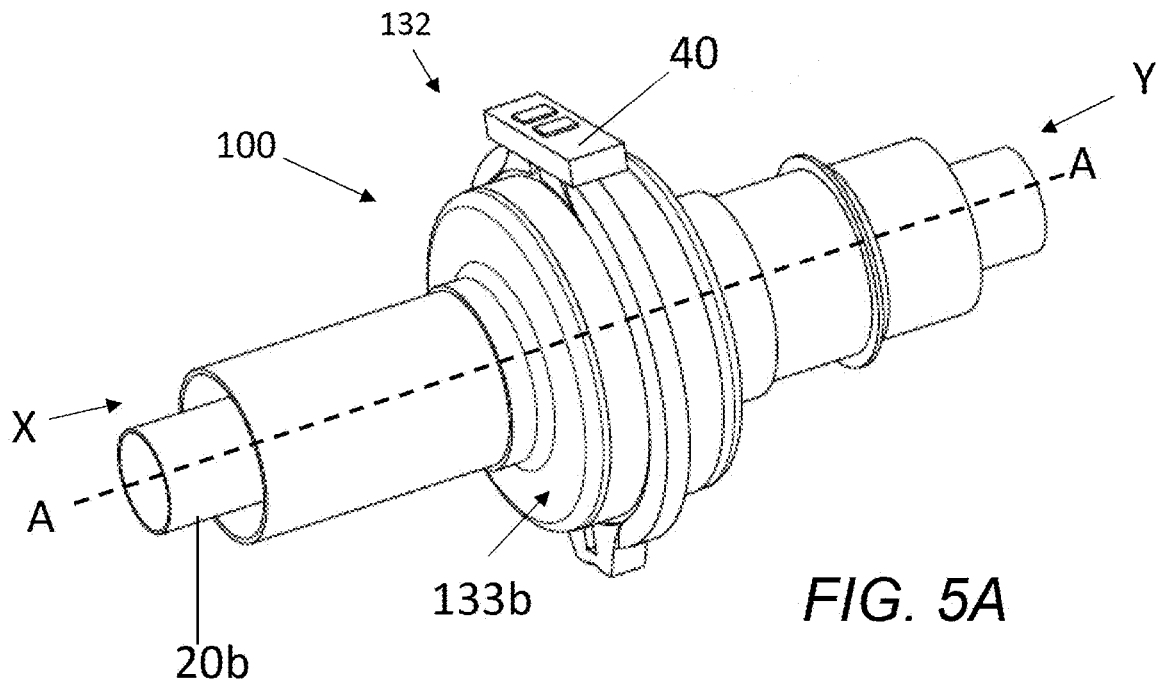
FIG. 5A shows another embodiment of a pipe joint in a closed configuration.
Figure 5B:
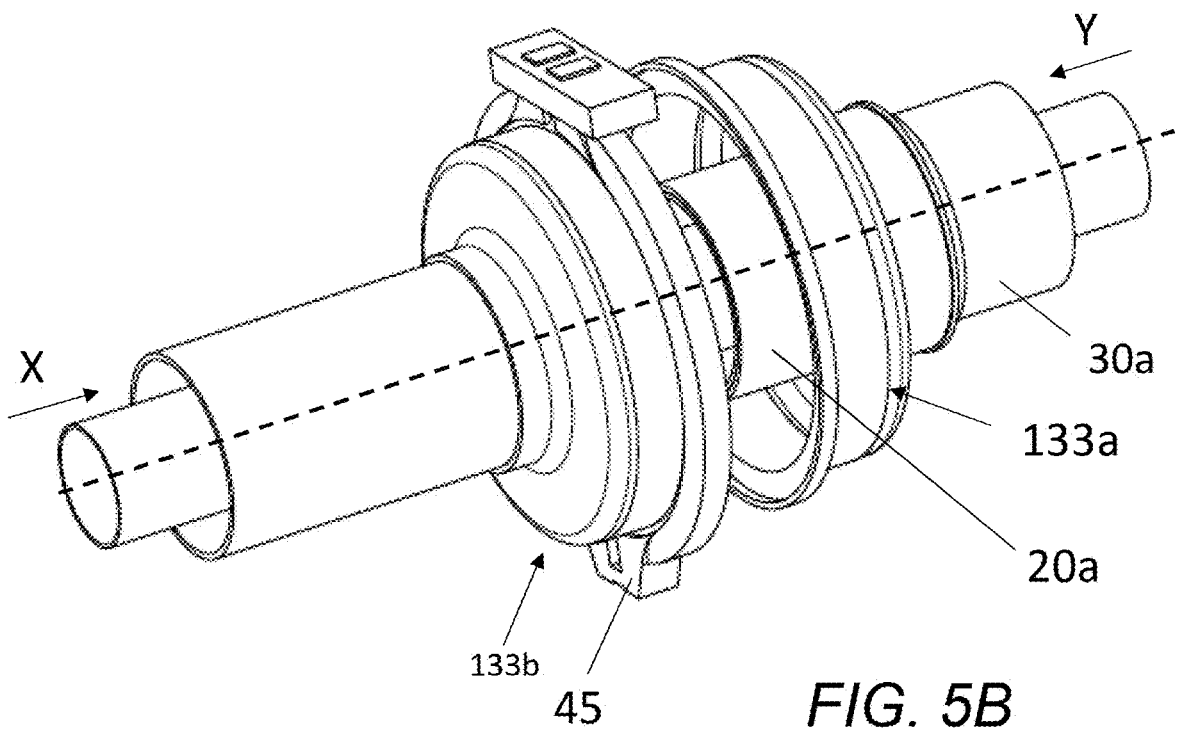
FIG. 5B shows the pipe joint of FIG. 5A in an open configuration.
Figure 6A:
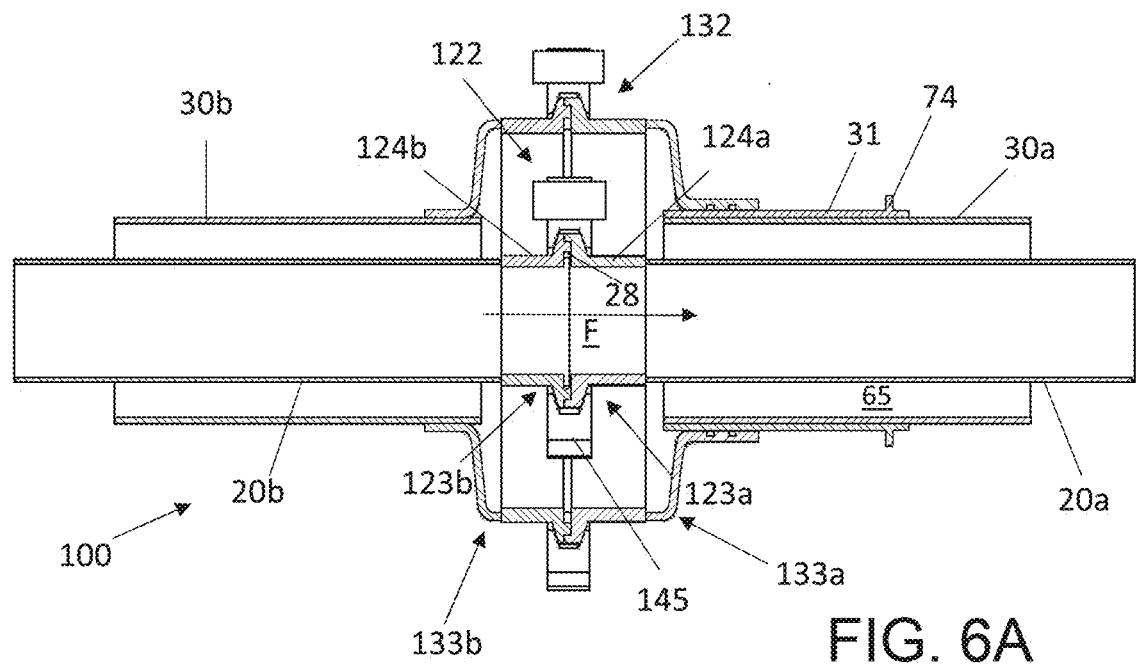
FIG. 6A shows a cross-section of the pipe joint of FIG. 5A.
Figure 6B:
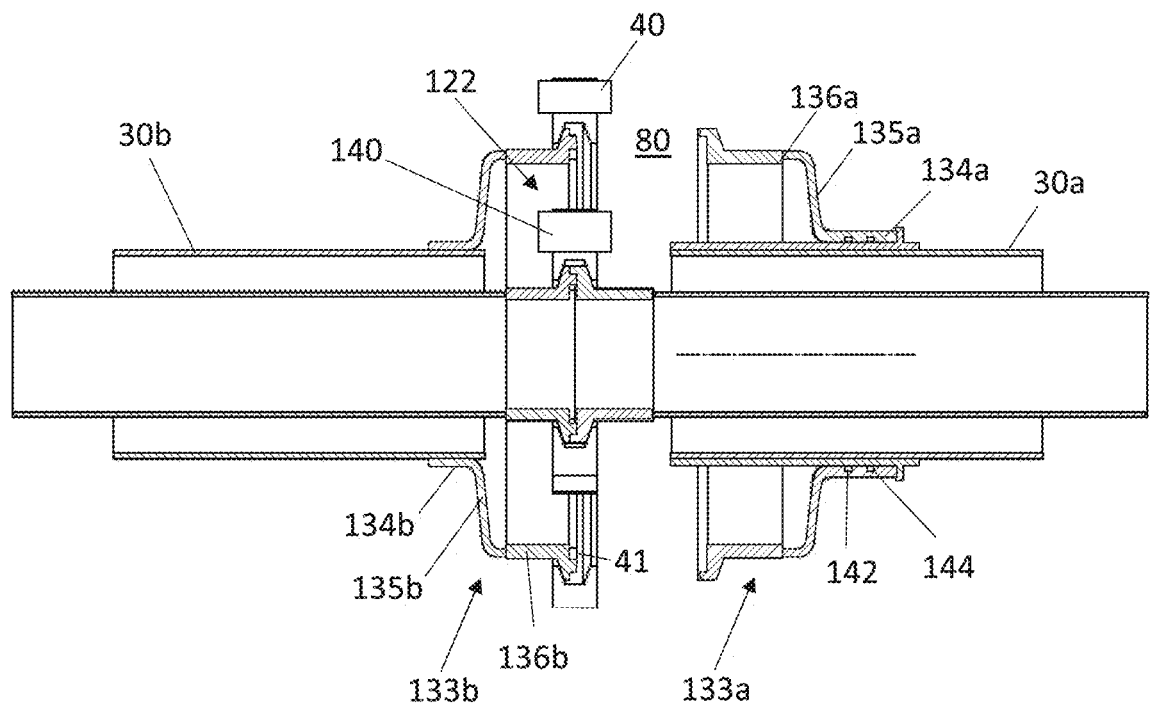
FIG. 6B shows a cross-section of the pipe joint in the open configuration of FIG. 5B.

A pipe joint 100 according to a further embodiment of the invention is shown in a closed configuration in FIGS. 5A and 6A and in an open configuration in FIGS. 5B and 6B. The pipe joint 100 comprises an inner pipe assembly within an outer pipe assembly. Certain elements of the pipe joint 100 and pipe joint 1 are identical, and have therefore been given the same reference numeral and not described in further detail again below. Equivalent elements are given the same reference number, incremented by 100.

A shroud 133a couples the first outer pipe portion to the second pipe portion via an outer pipe joint 132.

The second outer pipe portion comprises an assembly of parts 30b, 133b, including the second outer pipe 30b, and an end fitting 133b welded onto the second outer pipe 30b. As shown in FIG. 6B, the end fitting 133b has a first sleeve 134b welded to the second outer pipe 130b; a second sleeve 136b with a larger inner diameter than the first sleeve 134b, and a shoulder 135b which connects the first sleeve 134b to the second sleeve 136b.

The V-clamp 40 secures the shroud 133a to the end fitting 133b of the second outer pipe portion.

The inner pipe assembly comprises a first inner pipe portion coupled to a second inner pipe portion via an inner pipe joint 122.

The first inner pipe portion comprises an assembly of parts, including a first inner pipe 20a and a first end fitting 123a.

The second inner pipe portion comprises an assembly of parts including a second inner pipe 20b and a second end fitting 123b.

Similar to the pipe assembly 1, the inner pipe assembly is arranged to carry fluid, and provide an inner fluid flow path F that permits fluid to flow across the inner pipe joint 122.

The first end fitting 123a has a cylindrical body 124a welded to the end of the first inner pipe 20a. Similarly, the second end fitting 123b has a cylindrical body 124b welded to the end of the second inner pipe 20b.

The inner seal member 28 between the first end fitting 123a and second end fitting 123b creates a fluid tight arrangement preventing leaks through the inner pipe joint 122 from the inner fluid flow path F.

The pipe joint 100 is assembled by first assembling the inner pipe joint 122 with the shroud 133a in its withdrawn position as shown in FIGS. 5B and 6B, then assembling the outer pipe joint 132 as shown in FIGS. 5A and 6A.

The first inner pipe portion comprises a first annular flange and the second inner pipe portion comprises a second annular flange. The first and second annular flanges contact each other at the inner pipe joint 122.

To assemble the inner pipe joint 122, the annular flanges of the first and second end fittings 123a, 123b are brought together and secured using a V-clamp 140 with a hinge 145. Gap 80 provides access to the two end fittings 123a and 123b so that the V clamp 140 can be installed through the gap 80 and/or tightened by a tool extending through the gap 80.

The arrangement of the inner seal member 28 and the V-clamp 140 enables axial compression of the inner seal member 28 to provide a fluid tight arrangement at the inner pipe joint 122.

The V-clamp 145 can be removed via the gap 80, to enable the first and second inner pipe portions to be separated. The gap 80 also facilitates easy access to the inner pipe joint 122 for repair purposes. Once the necessary repair has been completed, the outer pipe joint 132 can then be re-assembled.

The shroud 133a is movably mounted to the first outer pipe portion 30a, 31. The shroud comprises a first sleeve 134a which engages the first outer pipe portion; a second sleeve 136a with a larger inner diameter than the first sleeve 134a; and a shoulder 135a which connects the first sleeve 134a to the second sleeve 136a. The second sleeve 136a of the shroud 133a has a large inner diameter. The first sleeve 134a carries two shroud seal members 142, 144 on its inner face.

The shroud seal members 142, 144 are positioned between the shroud 133a and the first outer pipe portion 30a, 31. The shroud seal members 142, 144 are in a state of compression in the radial direction.

To assemble the outer pipe joint 132 as shown in FIG. 6A, the gap 80 between the shroud 133a and the second outer pipe portion is closed by sliding the shroud 133a along the first outer pipe portion in the axial direction towards the second outer pipe portion until it comes into contact with the end fitting 133b of the second outer pipe portion. The outer pipe joint 132 is then secured using the V-clamp 40.

When the V-clamp 40 is closed and tightened to secure the shroud 133a to the end fitting 133b, its angled faces apply an axial force which urges the parts together, and places the outer seal member 41 in a state of compression in the axial direction.

The V-clamp 40 can be released and opened to enable the shroud 133a to be moved along the first outer pipe portion 30a, 31 in the axial direction and withdrawn away from the second outer pipe portion 130b, 133b. This opens up the gap 80, which provides access to the inner pipe joint 122 as shown in FIG. 6B.

The large inner diameters of the second sleeves 136a, 136b prevent them from clashing with the V-clamp 140 of the inner pipe joint 122.

The following comments apply to both the pipe joint 1 of FIG. 1 and the pipe joint 100 of FIG. 5A.

In the pipe joints 1, 100 the shroud is slidably mounted to the first outer pipe portion, and is slid along the first outer pipe portion during assembly or disassembly. In an alternative embodiment, the shroud may mounted to the first outer pipe portion on a helical thread, and moved along the first outer pipe portion during assembly or disassembly by rotating the shroud on the helical thread.

In the pipe joints 1, 100 the inner pipe joint 23b, 123b comprises an inner securing mechanism (fasteners 26 or V-clamp 140) which secures the first inner pipe portion to the second outer pipe portion, and the inner securing mechanism 26, 140 is configured to be releasable to enable the first inner pipe portion and the second inner pipe portion to be separated from each other. In an alternative embodiment, the inner securing mechanism may be a weld which is not releasable.

The inner and outer pipe assemblies do not touch at the pipe joint 1, 100—that is, there is an absence of mechanical connection between the inner pipe assembly and the outer pipe assembly at the pipe joint 1, 100.

An interspace 65 is provided between the inner pipe assembly and the outer pipe assembly. The interspace 65 is configured to provide an outer fluid flow path which extends in the axial direction and across the outer pipe joint 32, 132.

The interspace 65 may be used to contain any fluid which has leaked from the inner fluid flow path F. In the instance where the fluid is a cryogenic liquid such as hydrogen, the interspace 65 may be evacuated so that it contains a vacuum. Such a vacuum provides improved thermal insulation of the inner pipe assembly.

A continuous interspace 65 means that only a single evacuation system need be provided on one or other side of the joint 1, 100 rather than two evacuation systems (one on each side of the joint 1, 100).

The absence of mechanical connection between the inner pipe assembly and the outer pipe assembly at the pipe joint 1, 100 also avoids significant conductive heat transfer at the pipe joint 1, 100.

To maintain the coaxial arrangement between the inner pipe assembly and the outer pipe assembly, the pipe apparatus may comprise non-metallic spacers fitted in the interspace 65 remote from the pipe joint 1, 100. An example of such a spacer 90 is shown in FIG. 7.

The spacer 90 is square, with four points of contact with the outer pipe 30a or 30b, so it does not block the flow along the interspace 65 and has minimal conductive thermal connection with the outer pipe 30a or 30b. The spacer 90 is fixed to the inner pipe 20a or 20b, and has a sliding connection with the outer pipe 30a or 30b.

A number of such spacers 90 may be provided on either side of the pipe joint 1, 100, but these may be spaced some distance from the pipe joint 1, 100. The pipe apparatus may comprise any number of such spacers 90 on either side of the pipe joint 1. Preferably there are at least three separate points of contact between the spacer 90 and the outer pipes 30a, 30b.

The spacer 90 is shown in FIG. 7 to be generally square. However, the spacer 80 may be any suitable polygonal shape as long as there are at least three separate points of contact between the spacer and the outer pipe 30a or 30b. For example, the spacer may have a quadrilateral, pentagonal or hexagonal shape. The interspace 65 may contain Multi-Layer Insulation (MLI) to reduce radiated heat transfer.

The seal members 28, 41, 55, 142, 144 may be made of any suitable type of seal material, such as an elastomer, or a compressible metal. The seal members 28, 41, 55, 142, 144 may be O-rings with a toroidal shape and a circular cross-section in their uncompressed state. Alternatively the seal members 28, 41, 55, 142, 144 may have a non-circular cross-section in their uncompressed state.

The seal members 142, 144 are "piston seals" which are in a state of radial compression and have a sliding interaction with the sleeve 31 as the shroud 133*a* is moved.

The seal members 28, 41, 55, on the other hand, are "face seals" which are in a state of axial compression rather than a state of radial compression. Such face seals are preferred because they are less liable to pick up dirt than piston seals.

The inner and outer pipe assemblies may be made of any suitable metal, such as stainless steel, titanium, aluminium. Alternatively certain parts of the pipe assemblies, such as the outer pipes 30*a*, 30*b* and/or the inner pipes 20*a*, 20*b*, may be a hose made of a flexible material, such as rubber.

In the case of a cryogenic pipe system, 300-series steel is preferred as a material. In the case of a kerosene pipe system, titanium or aluminium may be preferred The pipe joint 1, 100 may be used in a number of different applications. For example, the pipe joint 1, 100 may be part of a pipe apparatus used in a laboratory environment, in an automobile or on a train. The pipe joint 1, 100 may also be used in an aircraft 150 shown in FIG. 9, which comprises a fuselage 155 and a pair of wings 153, 154. The pipe joints 1, 100 may be part of the fuel system of the aircraft 150, which may be located in the wings 153, 154 and/or in the fuselage 155 of the aircraft. For example the pipe joints 1, 100 may convey liquid hydrogen fuel from a hydrogen tank to a fuel cell which drives a propulsion engine on one of the wings 153, 154. Alternatively the pipe joints 1, 100 may convey liquid kerosene fuel from a fuel tank to an auxiliary power unit (APU) in the fuselage 155.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A pipe joint comprising:
an outer pipe assembly comprising a first outer pipe portion, a second outer pipe portion, and a shroud which couples the first outer pipe portion to the second outer pipe portion via an outer pipe joint, wherein the outer pipe joint comprises an outer securing mechanism which secures the shroud to the second outer pipe portion; and
an inner pipe assembly within the outer pipe assembly, the inner pipe assembly comprising a first inner pipe portion coupled to a second inner pipe portion via an inner pipe joint, wherein the inner pipe assembly is configured to provide an inner fluid flow path which extends in an axial direction and across the inner pipe joint,
wherein the shroud is movably mounted to the first outer pipe portion, and the outer securing mechanism is configured to be releasable to enable the shroud to be moved along a length of the first outer pipe portion in the axial direction and withdrawn away from the second outer pipe portion, thereby opening a gap between the shroud and the second outer pipe portion which provides access to the inner pipe joint,
wherein the shroud comprises a first sleeve which engages the first outer pipe portion; a second sleeve with a larger inner diameter than the first sleeve; and a shoulder which connects the first sleeve to the second sleeve.

2. The pipe joint of claim 1, further comprising an interspace between the inner pipe assembly and the outer pipe assembly, wherein the interspace is configured to provide an outer fluid flow path which extends in the axial direction and across the outer pipe joint.

3. The pipe joint of claim 2, wherein the interspace contains a vacuum, or the interspace is configured to contain a vacuum.

4. The pipe joint of claim 1, wherein the outer pipe joint comprises an outer seal member between the shroud and the second outer pipe portion, wherein the outer seal member is in a state of compression in the axial direction.

5. The pipe joint of claim 4, wherein the outer seal member is configured such that releasing the outer securing mechanism and/or withdrawing the shroud away from the second outer pipe portion causes the outer seal member to decompress in the axial direction.

6. The pipe joint of claim 1, wherein the first outer pipe portion comprises a shroud stop configured to limit a range of the movement of the shroud in the axial direction away from the second outer pipe portion.

7. The pipe joint of claim 1, wherein the first outer pipe portion comprises a pipe stop which engages the shroud and is configured to inhibit movement of the first outer pipe portion in the axial direction away from the second outer pipe portion, wherein the shroud is configured to disengage from the pipe stop as the shroud withdraws away from the second outer pipe portion.

8. The pipe joint of claim 7, further comprising a shroud seal member between the shroud and the first outer pipe portion, wherein the shroud seal member is between the shroud and the pipe stop, and the shroud seal member is in a state of compression in the axial direction.

9. The pipe joint of claim 1, further comprising a shroud seal member between the shroud and the first outer pipe portion.

10. The pipe joint of claim 1, wherein the outer securing mechanism comprises a clamp or fastener.

11. The pipe joint of claim 1, wherein the inner pipe joint comprises an inner securing mechanism which secures the first inner pipe portion to the second outer pipe portion, the inner securing mechanism is configured to be releasable to enable the first inner pipe portion and the second inner pipe portion to be separated from each other, and the shroud is configured to enable the gap to provide access to the inner securing mechanism such that the inner securing mechanism can be released via the gap.

12. The pipe joint of claim 1, wherein the inner fluid flow path contains fluid at a temperature below −150° C., or is configured to contain fluid at a temperature below −150° C.

13. The pipe joint of claim 1, wherein the inner fluid flow path contains liquid hydrogen or gaseous hydrogen, or is configured to contain liquid hydrogen or gaseous hydrogen.

14. The pipe joint of claim 1, wherein there is an absence of mechanical connection between the inner pipe assembly and the outer pipe assembly at the pipe joint.

15. The pipe joint of claim 1, wherein the first inner pipe portion comprises a first annular flange and the second inner pipe portion comprises a second annular flange, and
wherein the first annular flange abuts the second annular flange at the inner pipe joint.

16. A pipe joint comprising:
an outer pipe assembly comprising a first outer pipe portion, a second outer pipe portion, and a shroud which couples the first outer pipe portion to the second outer pipe portion via an outer pipe joint, wherein the outer pipe joint comprises an outer securing mechanism which secures the shroud to the second outer pipe portion; and an inner pipe assembly within the outer pipe assembly, the inner pipe assembly comprising a first inner pipe portion coupled to a second inner pipe portion via an inner pipe joint, wherein the inner pipe assembly is configured to provide an inner fluid flow path which extends in an axial direction and across the inner pipe joint, wherein the shroud is movably mounted to the first outer pipe portion, and the outer securing mechanism is configured to be releasable to enable the shroud to be moved along the first outer pipe portion in the axial direction and withdrawn away from the second outer pipe portion, thereby opening a gap between the shroud and the second outer pipe portion which provides access to the inner pipe joint, and wherein the first outer pipe portion has an external thread, and the outer pipe assembly further comprises an internally threaded nut which is carried on the external thread of the first outer pipe portion and abuts the shroud, wherein the shroud is positioned between the outer pipe joint and the internally threaded nut.

17. A pipe apparatus comprising:
the pipe joint of claim 1, and
at least one spacer fitted between the inner pipe assembly and the outer pipe assembly,
wherein the spacer is configured to maintain a co-axial relationship between the inner pipe assembly and the outer pipe assembly.

18. An aircraft comprising the pipe joint according to claim 1.

19. A method of disassembling the pipe joint of claim 1, the method comprising:
releasing the outer securing mechanism; then
moving the shroud along the first outer pipe portion in the axial direction to withdraw the shroud away from the second outer pipe portion, thereby opening up a gap between the shroud and the second outer pipe portion; and then
accessing the inner pipe joint via the gap to disassemble the inner pipe joint, thereby decoupling the first inner pipe portion from the second inner pipe portion.

20. A method of assembling the pipe joint of claim 1, the method comprising:
coupling the first inner pipe portion to the second inner pipe portion; then
closing a gap between the shroud and the second outer pipe portion by moving the shroud along the first outer pipe portion in the axial direction towards the second outer pipe portion; and then
coupling the first outer pipe portion to the second outer pipe portion by securing the shroud to the second outer pipe portion with the outer securing mechanism.

* * * * *